May 30, 1950     N. LANGER     2,509,439
APPARATUS FOR HEAT SEALING
Filed June 11, 1945
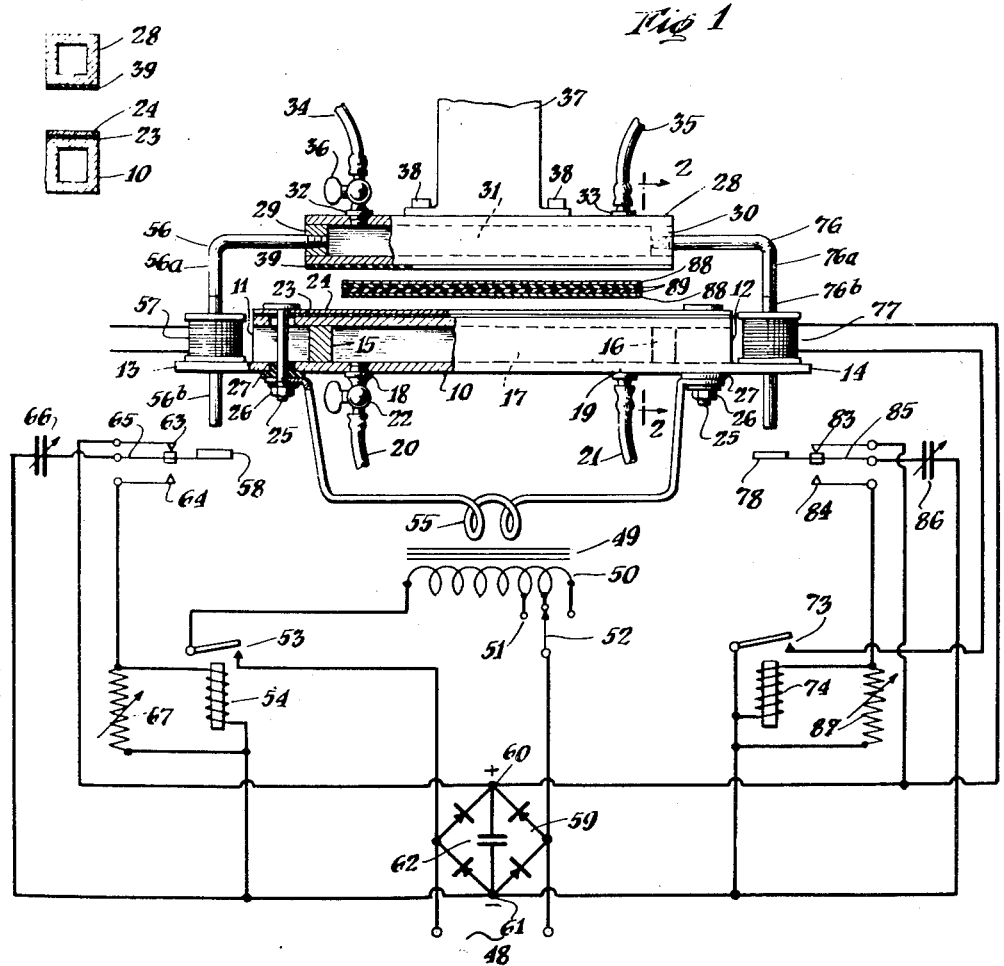
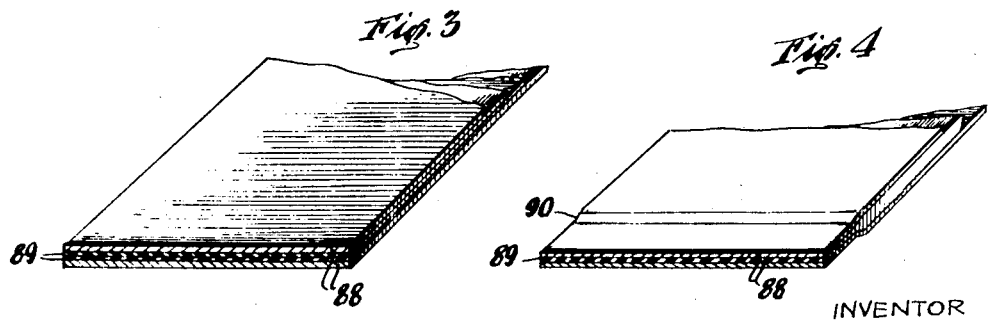
INVENTOR
Nicholas Langer Patented May 30, 1950

2,509,439

UNITED STATES PATENT OFFICE 2,509,439

APPARATUS FOR HEAT SEALING

Nicholas Langer, New York, N. Y.

Application June 11, 1945, Serial No. 598,777

20 Claims. (Cl. 154—42)

The present invention relates to the art of heatsealing thermoplastic materials, and, more particularly, to a novel and improved method of heatsealing sheets including a thermoplastic layer, and to an apparatus for carrying such method into practice.

The present application is a continuation-in-part of my copending application Serial No. 572,882, filed January 15, 1945, entitled Method of heatsealing and apparatus therefor, now Patent 2,460,460.

As those skilled in the art know, thermoplastic sheets are at present used on a very substantial scale for packaging and related purposes. Examples of such sheets are Pliofilm, Koroseal, Vinylite, heatsealing Cellophane, and the like, all of which are readily obtainable on the market in sheets of various thickness. The principal advantage of these sheets is that they may be employed in forming bags, envelopes, and similar containers for fluid-tightly enclosing the packaged material or at least preventing the entrance into or the discharge of moisture from the interior of the package. Another important advantage of such sheets is their heatsealing character, whereby substantially fluid-tight or moisture-proof seams may be formed therein by the application of heat and pressure to the regions where such seams are to be formed. In general, the surfaces of the sheets to be provided with a seam are brought together into face to face position and heat is applied to such regions to heat the thermoplastic materials to temperatures at which they become plastic or tacky. The substantially simultaneous application of pressure thereto will cause welding or heatsealing of the plasticized regions so that upon cooling a fluid-tight or moisture-proof seam is formed which is mechanically as strong as the other regions of the sheet.

The thermoplastic sheets are in some cases employed for packaging purposes in their original condition but frequently they are laminated or otherwise combined with sheet-like materials which are flexible, although not thermoplastic. The object of such combination is to rely principally upon the auxiliary sheet or base for mechanical strength and thereby to reduce the thickness of the relatively expensive thermoplastic sheet. In many cases the paper or foil base is merely coated with the thermoplastic material, a relatively thin coating being sufficient to assure the fluid-tight character of the finished sheet-like product. An added advantage of such composite sheets is that the paper or foil base, which in most cases forms the exterior of the finished package, can be easily provided with printing and thus tends to enhance the attractiveness and the sales appeal of the finished product.

Conventional heatsealing machines practically invariably comprise a pair of heatsealing bars or jaws at least one of which is made of metal and is maintained at heatsealing temperatures for example by means of an electrical heater element inserted therein, and the other of which may be made of metal or rubber and is generally unheated. The two sheets to be sealed together or the two regions of the same folded sheet are brought into face to face position and are introduced between the said heatsealing bars or jaws. Thereafter, the two jaws are pressed together, causing heating of the thermoplastic layers and partial fusion and heatwelding thereof. After this has been accomplished, the jaws are again separated and the sheets are removed from the machine. Essentially, this identical procedure is employed for forming the empty bag or envelope from one or more sheets of the thermoplastic material and also for placing the final seal upon the container or package after it has been filled with the commodity to be packaged.

It is an object of the invention to provide an improved method of heatsealing thermoplastic sheets in which the welding heat is practically instantaneously generated in a metallic layer of greatly reduced thickness and is transferred to the regions to be sealed by means of surface contact.

Another object of the invention is to provide a heatsealing method in which heat is generated in the sealing region by practically instantaneously dissipating a predetermined amount of electrical energy in a conductive surface in surface contact with such region, and sealing pressure is automatically maintained until both said surface and that of the seam had sufficient time to cool below heatsealing temperatures.

It is a further object of the present invention to provide an improved heatsealing method in which the sealing region is exposed to the combined effect of heat practically instantaneously generated therein by means of electrical action and to substantially continuous heat withdrawal by means of a cooling fluid, the rate of heat generation being so adjusted with respect to that of the heat withdrawal that the heating effect predominates during a small portion of the sealing cycle and the cooling effect predominates during the major portion or remainder of said cycle.

It is also within the contemplation of the present invention to provide a heatsealing machine of novel and improved character comprising a pair of pressure bars, at least one of which carries a heater element of greatly reduced heat capacity, and control means for practically instantaneously heating said element to heatsealing temperatures, while making provision for rapid and positive cooling of said element below such temperatures after the seam has been formed.

The invention also contemplates a heatsealing machine which is very simple in construction, which is instantaneously available for sealing operation at any time, which may be directly operated from commercial power lines, and which may be readily manufactured on a practical and commercial scale at a low cost.

Other and further objects and advantages of the invention will become apparent from the following description, taken in conjunction with the accompanying drawing; in which Fig. 1 is a side elevational view, somewhat fragmentary in character and having parts in section, of a preferred embodiment of the invention together with a preferred form of circuit organization;

Fig. 2 is a section taken on line 2—2 of Fig. 1;

Fig. 3 is a perspective view of a pair of composite sheets prior to the heatsealing operation; and Fig. 4 is a similar view of the same sheets after the heatsealing operation.

Referring now more particularly to Figs. 1 and 2 of the drawing, reference character 10 denotes the lower heatsealing member or bar preferably formed in a rectangular tubular shape and made of a highly heat conducting metal, such as copper or aluminum. The terminal regions of this tubular member are cut off as indicated at 11 and 12, leaving the bottom side of the member extending right and left, constituting integrally formed mounting extensions 13 and 14.

The major portion of heatsealing member 10 is sealed off from the exterior by means of metal plugs 15 and 16 welded or brazed to the said member and defining therein an inner cooling space or channel 17. A cooling fluid inlet port 18 and outlet port 19 are provided for the introduction of a suitable cooling fluid, such as water, into the cooling space and for the discharge of such fluid therefrom. This is accomplished by means of flexible conduits or tubes 20 and 21, respectively, attached to suitable nipples in a manner well understood. A valve 22 is provided between the inlet port 18 and conduit 20 to control the admission of cooling fluid to the cooling space.

Upon the top surface of heatsealing member 10 there is provided a thin layer 23 of an electrical insulating material which is not adversely affected by heatsealing temperatures. This may be constituted of mica, of suitable heat-resistant resins of silicon base known in the trade as "silicones" or of a suitable lacquer or coating. It has been found that in many cases a suitable oxide layer or film formed on the surface of the heatsealing member by means of a chemical or electro-chemical treatment provides excellent results, due to the greatly reduced thickness and the extremely tenacious character of such films.

A heater element 24 is mounted on the upper surface of member 10 under moderate tension, separated therefrom by insulating layer 23, and is secured thereto by means of a pair of bolts 25 and nuts 26. The bolts are insulated from the body of the member 10 by means of insulative bushings 27. The heater element is a narrow strip of thin metal, preferably having a high specific resistance and being resistant to the adverse effect of high temperatures, such as a suitable nickel-chromium alloy.

Heatsealing member 10 is adapted to cooperate with a pressure member or bar 28. In general, this may be constituted of metal or of a suitable insulating material which may be, if desired, of a slightly yielding character, such as natural or synthetic rubber. In its preferred and illustrated form, however, pressure member 28 is formed of a metal tube of rectangular cross section similar in character to member 10. The ends of pressure member 28 are closed by metal plugs 29 and 30, respectively, defining cooling space 31 therein. A cooling fluid may be circulated through the said space through inlet port 32, and outlet port 33, by means of flexible conduits 34 and 35, respectively attached to the said ports by means of conventional nipples. The flow of cooling fluid may be adjusted by means of a valve 36 at the inlet port 32. Pressure bar .8 is adapted to be displaced and pressed against the operative surface of heater element 24 by means of a suitable operating mechanism, which is diagrammatically indicated by a reciprocable support 37, secured to pressure bar 28 by means of bolts 38. A thin insulating layer 39 may be provided on the lower or operative surface of pressure member 28, said layer being of a character similar to that of insulating layer 23 on heatsealing member 10.

Heater element 24, may be energized from the alternating current power line 48 through a stepdown transformer 49. This transformer is of the type used in welding machines and may be provided with a high-voltage primary winding 50 with a plurality of taps 51 thereon selectively connected to one side of the source through a selector switch 52, while the other end of the said winding may be connected to the other side of the source through contacts 53 of a direct current relay 54. Secondary winding 55 comprises a few turns of very heavy copper wire or bar and has its ends connected to the ends of heater element 24 through bolts 25. This winding is capable of delivering at a low voltage a very heavy current to the heater element, sufficient to increase its temperature practically instantaneously to heatsealing temperatures, which according to the nature of the materials to be heatsealed may be from about 80° C. to about 300° C., or more. As continued application of heating current to heater element 24 may be sufficient to heat the said element to incandescence or even to melt and to destroy the same, a switching or control mechanism is provided limiting the application of current to the transformer to a relatively short period, generally a mere fraction of a second.

The switching or control mechanism is operable by means of an L-shaped actuating rod 56 one end of which is inserted into plug 29 of pressure bar 28 and the other end of which extends through the axial space of a locking coil 57 and through a corresponding aperture in extension 13 of the heatsealing member 10. It is preferred to form the upper portion 56a of this rod of ferromagnetic metal, such as iron, and its lower portion 56b of diamagnetic metal, such as brass, for reasons which appear presently. During operative displacement of pressure bar 28, actuating rod 56 will be likewise displaced by a corresponding amount and towards the end of its stroke will actuate switch 58.

The switching mechanism is arranged for operation by direct current which is obtained by means of a bridge rectifier 59 having its input terminals directly connected to the alternating current source 48 and providing direct current voltage between its output terminals 60 and 61. A condenser 62 of a capacity of several microfarads may be connected between the said terminals, in order to reduce alternating current ripple.

Switch 58 comprises a rest contact 63, a working contact 64, and a switching arm 65. Rest contact 63 is connected to the positive terminal 60 of the D. C. source, an adjustable capacitor 66 is connected between switching arm 65 and negative terminal 61 of the D. C. source, and the operating coil of relay 54 is connected between working contact 64 and the negative terminal of the D. C. source. An adjustable resistance 67 is connected across the operating coil of the relay for regulating the amount of current flowing therethrough by bypassing a portion thereof.

It has been found desirable to provide a locking mechanism for automatically maintaining the heatsealing members in pressure-applying relation for a predetermined period for each sealing operation. This mechanism is actuated by an actuating rod 76, similar in material, structure and function to rod 56 at the other side of the machine. The upper portion of this actuating rod, 76a, is constituted of iron, and its lower portion is constituted of brass, or some other non-magnetic material. It extends through the axial space of a second locking coil 77 and a corresponding aperture in extension 14 of the heatsealing member 10. This rod is adapted to cooperate with a switch 78 having a rest contact 83, a working contact 84 and a switching arm 85. Rest contact 83 is connected to positive terminal 60 of the D. C. source, an adjustable capacitor 86 is connected between switching arm 85 and negative terminal 61 of the D. C. source, and the operating coil of a relay 74, having an adjustable resistance 87 connected across the same, is connected between working contact 84 and terminal 61 of the D. C. source. Locking coil 77 has its ends connected directly to terminal 60 of the D. C. source, and to terminal 61 of the said source through relay contacts 73, respectively, when the relay is energized. The other locking coil 57 may be connected across coil 77 or may be connected in series therewith for joint operation.

From the foregoing description, the operation of the heatsealing machine of the invention will be readily understood by those skilled in the art. It is to be observed at the outset that in the normal position of rest of the machine (with members 10 and 28 separated from each other), neither the resistance element 24, nor the locking coils 57 and 77 are energized. On the other hand, a constant potential difference will be maintained between terminals 60 and 61 of the bridge rectifier 59. Condenser 66 will be charged through the normally closed contact 63 and switching arm 65, same as condenser 86, which will be charged through normally closed contact 83 and switching arm 85. Thus, a predetermined amount of electrical energy will be stored in each condenser depending upon the capacity of the condenser and the applied voltage.

When it is desired to apply a heatseal to a pair of sheets, each comprising a non-fusible backing layer 88 and and a thermoplastic or fusible layer 89, (Figs. 1 and 3), the said sheets are inserted between the heatsealing members 10 and 28 so that their fusible layers are brought into face to face position. Thereafter the two members are brought together by means of operating mechanism 37, which may be either manually or power-operated, and pressure is applied upon the sealing region of the said sheets. A suitable cooling fluid, such as water, is circulated through cooling spaces 17 and 31 of heatsealing member 10 and pressure member 28, respectively, the rate of flow and that of cooling being adjusted by means of valves 22 and 36.

Upon downward displacement of pressure member 28, actuating rods 56 and 76 will be likewise displaced. Of these, the lower end 56a of rod 56 will actuate switch 58 and will displace its switching arm 65 from its upper into its lower position. Thus, connection of the condenser 66 to terminal 60 will be interrupted between rest contact 63 and switching arm 65 and shortly thereafter the charged condenser will be connected to the operating coil of relay 54 by switching arm 65 closing working contact 64. The condenser will begin to discharge through the relay and the energized relay will close its contacts 53, thereby completing the primary circuit of transformer 49. A heavy current will result in the secondary circuit of transformer comprising secondary winding 55 and heater element or strip 24 and this current will practically instantaneously heat the said element to heatsealing temperatures. The hot resistance element being in intimate surface contact with the heatsealing region of the thermoplastic sheets, will rapidly heat the fusible layers of such sheets to welding temperatures and this, in conjunction with the pressure applied to the sealing region, will cause the production of a perfect seal or seam 90 as this will be best observed in Fig. 4 of the drawing. In this seam the boundary surface between the two thermoplastic layers 89 will completely disappear.

The charge of condenser 66, however, will be quickly dissipated in the operating coil of relay 54. Thus, after a predetermined short period, the relay will be automatically deenergized and will open the primary circuit of the transformer. As the heat capacity of heater element 24 is quite small, its temperature will rapidly fall below heatsealing temperatures, giving the sealed region a chance to cool and to consolidate.

The period during which electrical energy is applied to heater element 24 is determined in accordance with various considerations such as the length of the sealing region, the number and the thickness of the thermoplastic sheets, the character and the softening point of the thermoplastic layer, the number of heatsealing operations per minute, and the like. The amount of energy applied per unit of time may be adjusted by adjusting the primary taps 51 of transformer 49 by means of switch 52, while the operating period may be adjusted by adjusting the capacity of condenser 66, either continuously or in steps, or by adjusting by-pass resistance 67 across relay 54. Obviously, the smaller the capacity of the condenser and the smaller the by-pass resistance, the quicker the condenser will discharge and will release the relay armature, thereby discontinuing the current through the heater element. Of course, various different types of time delay devices and circuits may be employed with equal or similar results such as particularly circuits in which the time constant characteristics of a capacity-resistance combination control the alternating current input circuits by means of space discharge devices of suitable type.

Various modifications are also possible in the construction of the heater element. Although in the illustrated case this element has been provided in the form of a flat strip of plane surface and of reduced thickness, it is also possible to provide the strip with longitudinal or transverse corrugations which are maintained by correspondingly shaping its support and by providing a pressure bar of conforming shape (not shown). In some cases it is also beneficial to provide the upper or operative surface of the heater element with a thin coating of insulating material (not shown). This insulating material may be a suitable heat-resistant lacquer or preferably a thin oxide layer formed on the surface of the element by means of an anodic treatment or by some other method. The object of the provision of this insulative layer is to prevent direct electrical contact of the heater element with the material to be heatsealed or with the pressure member or bar and is desirable only when the backing sheet of the thermoplastic layer is a conductor, such as metal foil. The provision of such insulative layer, however, is by no means absolutely necessary, experience having shown that the thin layer of aluminum foil in surface contact with the heater element will by-pass only a negligible amount of the very heavy current through the said element, and that the metallic pressure bar will not come into direct contact with the heater element even in the compressed position but remains separated therefrom by the interposed thickness of the sheets to be heatsealed.

The heater element 24 is in intimate heat exchange relation with tubular member 10 through which a continuous flow of cooling fluid is passed and from which the heater element is separated merely by the insulative layer 23 of greatly reduced thickness. Thus, the heater element and the sealing region of the thermoplastic layers are rapidly and positively cooled causing quick consolidation of the seam formed. On the other hand, the heating effect of the current impulse passed through the heater element during the energized condition thereof is so rapid and intense, that such heating effect upon the sealing region will not be appreciably interfered with by the continuous cooling effect of the cooling fluid. In other words, the substantially instantaneous heating effect of the electrical current passed through the heater element will predominate upon the continuous but slower cooling effect of the fluid. This is accomplished by properly adjusting the heating rate with respect to the cooling rate. In general, the complete period required for forming a sound seam may be divided into a relatively short heating cycle and a relatively long cooling cycle. For example, in an automatic sealing machine the heating cycle may be in the order of $\frac{1}{10}$ of a second and the cooling cycle may be in the order of $\frac{7}{10}$ of a second, although, of course, very wide variations are possible and perfectly sound seams may be formed at much higher speeds.

Rapid cooling of the seams formed is further promoted by the circumstance that the seam is quickly and positively cooled also from the other side by means of the fluid cooled pressure member 28. It may be pointed out, however, that positive cooling of the pressure member is not absolutely necessary and the said member may be constituted of solid metal, rubber, and the like. As a further variation of my invention, the pressure member 28 may be the only one which is positively cooled by passing a cooling fluid therethrough and the heatsealing member 10 may be a solid bar of metal, rubber, and the like, with the heater element 24 thereon.

It will be noted that the circuit and the operation of the locking mechanism is substantially identical with that of the operating circuit of the heater element. In the normal position of rest, condenser 86 is charged, since one of its terminals is connected to terminal 60 of the direct current source through rest contact 83 and switching arm 85 of switch 78, and its other terminal is connected to terminal 61 of the same source. Upon downward displacement of pressure bar 28 for carrying out a heatsealing operation, the lower portion 76b of operating rod 76 will depress switching arm 85 and will close working contact 84, thereby connecting the charged condenser across the coil of relay 74. The condenser will discharge through the relay coil so that the relay will be energized and will close its contacts 73. This, in turn, will complete the circuit of locking coils 57 and 77 which upon being energized will strongly attract the upper portions 56a and 76a of actuating rods 56 and 76, made of ferromagnetic material and will prevent separation of the pressure bar 28 from the heatsealing bar 10 and heater element 24, thus maintaining pressure upon the interposed thermoplastic sheets. After a predetermined period of time thereafter, the condenser will discharge through the relay coil and the locking coils will be again deenergized and will release the pressure bar by opening of the relay contacts 73. Of course, concurrently with the locking operation, switch 58 will be likewise energized for a predetermined period, as described in the foregoing, and will apply heating current to heater element 24 for another predetermined period.

The period for which the pressure bar is locked is determined by the direct current voltage prevailing between terminals 60 and 61, the capacity of condenser 86, and by the value of adjustable by-pass resistance 87. It may be adjusted to any desired value by varying any one or all of these quantities, as those skilled in the art will readily understand. Preferably, the locking period is so determined as to be longer than the period for which the heater element 24 is energized in order to maintain the pressure upon the sheets some time after heatwelding of the sheets and thereby allowing sufficient time for the sealed regions to cool.

Although the present invention has been disclosed in connection with a few preferred embodiments thereof, variations and modifications may be resorted to by those skilled in the art without departing from the principles of the present invention. Thus, instead of controlling the time delays by means of a mechanical relay, equal or similar results may be obtained by using space discharge devices periodically actuated by the time constant characteristics of a condenser-resistance network. Examples of such space discharge devices are glow-discharge tubes, vacuum tubes, Thyratron tubes, ignitron tubes, grid-glow tubes, and the like.

In the described preferred embodiment of the invention the heatsealing member 10 has been shown to be stationary and the pressure member, 28, to be displaceable by means of manually or power-operated elements in order to apply pressure upon the interposed layers to be heatsealed. Of course, this mode of operation may be reversed and the heatsealing member 10 may be made to be displaceable against a stationary pressure bar or backing plate, or both heatsealing and pressure members may be displaced towards one another.

It is also to be observed that my inventive concept of maintaining the sealed region under compression after the heating cycle for a predetermined period sufficient to permit the seam to cool and to consolidate is, in its broad aspects, independent of the specific means for accomplishing this result. Thus, in fully automatic packaging machines the proper phasing of the compression cycle with respect to the heating cycle may be directly accomplished without resorting to locking solenoids and the like by means of a suitably timed actuating mechanism including, for example, appropriately shaped cams driven by the main operating shaft of the machine and cooperating with cam followers, and the like.

Furthermore, while in the specification and in the claims frequent reference is made to sealing two thermoplastic sheets together, this language is to be construed to include the case when two portions of the same thermoplastic sheet are brought into face to face position. This procedure is frequently employed where a single web of thermoplastic material is folded around a former plate and the longitudinal marginal portions of the web are sealed together to constitute a tube which is then separated into bag or envelope-constituting portions of uniform length. The invention, of course, is also applicable to thermoplastic sheets which are not laminated with paper or foil. I consider all of these variations and modifications to be within the true spirit and scope of the present invention, as disclosed in the foregoing description and defined by the appended claims.

What is claimed is:

1. A heatsealing machine comprising in combination a pair of elongated pressure members, at least one of said members being constituted of material of high heat conductivity and having an inner channel therein, a layer of insulation on said channeled member, an electrically conducting heater element on said layer extending along said channeled member, the heat capacity of said element being low as compared to that of said channeled member and said layer of insulation being sufficiently thin to maintain said heater element in intimate heat exchange relation with but electrically disconnected from said channeled member, means for pressing said members together to apply pressure to a region of a pair of interposed heatsealable sheets, means for passing current for a short heating period through said heater element to raise the temperature thereof and of the said region of the sheets to heatsealing temperatures, and means for passing a cooling fluid through the channel of said member for rapidly cooling and consolidating the seam formed in said region immediately after said heating period.

2. A heatsealing machine comprising in combination a pair of elongated pressure jaws having opposed cooperating surfaces, at least one of said jaws being constituted of metal of high heat conductivity and having a longitudinal channel therein, a layer of insulation on said channeled jaw, a heater element mounted on said layer of insulation, the heat capacity of said element being low as compared to that of said channeled jaw and said layer of insulation being sufficiently thin to maintain said heater element in intimate heat exchange relation with but electrically disconnected from said channeled jaw, means for displacing said jaws towards one another to apply pressure to a corresponding region of a pair of heatsealable sheets interposed therebetween, switching means for connecting a source of current to said heater element for a predetermined period to rapidly heat said element, and means for passing a cooling fluid through said channel to withdraw heat from said jaw and said heater element, the heating effect of said element predominating during said heating period to rapidly heat said interposed region of the sheets to heatsealing temperatures and the cooling effect of said fluid predominating after said period to rapidly cool and to consolidate the seam formed in the said region.

3. A heatsealing machine comprising in combination a pair of elongated pressure jaws having parallel-spaced cooperating surfaces, a layer of electrically non-conducting character on said surfaces, at least one of said jaws being made of metal and having an inner cooling space therein, a heater element mounted on one of said non-conducting layers, the heat capacity of said element being low as compared to that of said jaw and said last-named non-conducting layer being sufficiently thin to maintain said heater element in intimate heat exchange relation with but electrically disconnected from said jaw, means for displacing said jaws towards one another to apply pressure to an interposed region of a pair of heatsealable sheets, switching means for connecting said heater element to a source of current, means operable concurrently with said displacing means to actuate said switching means for a predetermined period thereby to rapidly heat said element and said region of the sheets to heatsealing temperatures concurrently with the application of pressure thereto, and means for passing a continuous flow of cooling fluid through said cooling space, the heating effect of said element predominating during the heating period and the cooling effect of said fluid predominating after said period.

4. A heatsealing machine comprising in combination a stationary and a movable pressure jaw having spaced cooperating pressure surfaces, one of said jaws at least being made of metal of high conductivity and having a longitudinally extending cooling space therein, inlet and outlet ports for said cooling space, a layer of material of low electrical conductivity on the pressure surface of the last-named jaw, a metallic heater ribbon tensioned upon said layer, the heat capacity of said ribbon being low as compared to that of said cooled jaw and said layer of low conductivity being sufficiently thin to maintain said heater ribbon in intimate heat exchange relation with but electrically disconnected from said cooled jaw, means for displacing said movable jaw towards the other to apply pressure to an interposed region of a pair of heatsealable sheets, switching means under the control of said displacing means to connect said heater ribbon to a source of current thereby to heat said ribbon and said region of the sheets in contact therewith to heatsealing temperatures concurrently with the application of pressure thereto, means for disabling said switching means a predetermined period thereafter, and means for continuously introducing a cooling fluid through said inlet port and discharging such fluid through said outlet port to effectively cool the corresponding jaw, the heating effect of the heater element predominating during said period and the cooling effect of said fluid predominating after such period.

5. A heatsealing machine comprising in combination a pressure member, a backing member therefor, a layer of insulation on said pressure member, an elongated heater strip mounted on the surface of said layer of insulation, the heat capacity of said strip being low as compared to that of said pressure member and said layer of insulation being sufficiently thin to maintain said heater strip in intimate heat exchange relation with but electrically disconnected from said pressure member, means for positively and continuously cooling said pressure member and the heater strip thereon, means for pressing said members together to apply pressure to a region of a pair of sheets to be heatsealed interposed therebetween, a switching mechanism operable upon relative displacement of said pressure and backing members to connect said heater strip to a source of current thereby to heat said strip and the region of the sheets in contact therewith to heatsealing temperatures concurrently with the application of pressure thereto, a time delay mechanism to disable said switching mechanism a predetermined period thereafter, and means for so adjusting the amount of heat generated in said strip during the energized period thereof and the amount of heat continuously withdrawn therefrom by said cooling means that the heating effect of said strip predominates in the sealing region during said period and the cooling effect of the cooling means predominates in said region after such period.

6. A heatsealing machine comprising in combination a hollow tubular first pressure member made of metal of high heat conductivity, a layer of insulation on said member, means for passing a continuous flow of cooling fluid through said member, a second pressure member adapted to cooperate therewith, an elongated electrically conducting heater element mounted on said layer of insulation, said layer of insulation being sufficiently thin to maintain said heater element in intimate heat exchange relation with but electrically disconnected from said first pressure member, means for causing relative displacement of said members to apply pressure to a limited region of a pair of sheets to be heatsealed interposed therebetween, a switching mechanism operable by relative displacement of said members to connect the ends of said heater element to a source of current thereby to heat said element practically instantaneously to heatsealing temperatures concurrently with the application of pressure thereto, and means for adjusting the current flowing through said heater element so that its heating effect predominates over the cooling effect of said fluid.

7. A heatsealing machine comprising in combination a generally tubular first pressure member constituted of metal of high heat conductivity, a second pressure member therefor, said members having cooperating pressure surfaces and being mounted for reciprocation with respect to each other, a thin layer of an electrical insulating material on the operative surface of said first pressure member, a heater strip mounted on said insulating layer, the heat capacity of said strip being low as compared to that of said first pressure member and said insulating layer being sufficiently thin to maintain said heater strip in intimate heat exchange relation with but electrically disconnected from said first pressure member, means for reciprocating said members to apply transient pressure to a limited region of a pair of sheets to be heatsealed interposed therebetween, a switching mechanism operable upon relative displacement of said members to connect the ends of said heater strip to a source of current thereby to heat practically instantaneously said strip and the region of the sheets in contact therewith to heatsealing temperatures concurrently with the application of pressure thereto, a time delay mechanism for disabling said switching mechanism a predetermined period thereafter, means for adjusting the current flowing through said heater strip, means for adjusting said time delay period, means for passing a flow of cooling fluid through said first pressure member, and means for adjusting said flow of cooling fluid.

8. A heatsealing machine comprising in combination a pair of cooperating pressure bars constituted of metal of high heat conductivity mounted for reciprocation, a layer of insulation mounted on at least one of said bars, a heater strip mounted on said layer of insulation, the heat capacity of said strip being low as compared to that of said bar and said layer of insulation being sufficiently thin to maintain said heater strip in intimate heat exchange relation with but electrically disconnected from its supporting bar, means for reciprocating said bars to apply pressure upon a region of a pair of thermoplastic layers interposed between said bars, means for electrically energizing said heater strip thereby to practically instantaneously heat the same and said region of the interposed layers to heatsealing temperatures, and means for applying a flow of cooling fluid to said bars to rapidly cool said bars, said heater strip and the seam formed in the said region to seam-consolidating temperatures after said heater strip is deenergized.

9. A heatsealing machine comprising in combination a pair of reciprocable bars, a layer of insulation on at least one of said bars, an elongated heater element mounted on the surface of said layer of insulation, said layer of insulation being sufficiently thin to maintain said heater element in intimate heat exchange relation with but electrically disconnected from the said bar, means for causing relative displacement of said bars to apply pressure upon a sealing region of a pair of heatsealable layers interposed between said bars, means for dissipating a predetermined amount of electrical energy in said heater element during the time said layers are compressed sufficient to practically instantaneously heat said element and said region to heatsealing temperatures, and a cooling system for at least one of said bars for rapidly cooling said bar, said heater element and said region to seam-consolidating temperatures as soon as said electrical energy has been dissipated.

10. A heatsealing machine comprising in combination a pair of reciprocable bars, a layer of insulation on the operating surface of one of said bars, an elongated metallic heater element mounted on said layer of insulation, the heat capacity of said element being low as compared to that of said bar and said layer of insulation being sufficiently thin to maintain said heater element in intimate heat exchange relation with but electrically disconnected from the said bar, means for causing relative displacement of said bars towards each other to apply pressure upon a sealing region of a pair of superposed heatsealable layers interposed between said bars, means for applying a predetermined amount of electrical energy to said heater element during the time said layers are compressed to practically instantaneously raise the temperature of said element and of said region of the layers to heatsealing temperatures to form a seam, means for passing a cooling fluid through at least one of said bars to rapidly withdraw heat from said seam, and means for locking said bars in the compressed position until said seam is consolidated.

11. A heatsealing machine comprising in combination a pair of reciprocable bars constituted of material of high heat conductivity, a layer of insulation mounted on the operating surface of one of said bars, a heater element in the form of a relatively thin metal strip mounted on said layer of insulation, the heat capacity of said element being low as compared to that of said bar and said layer of insulation being sufficiently thin to maintain said heater element in intimate heat exchange relation with but electrically disconnected from the said bar, means for causing relative displacement of said bars towards each other to apply pressure upon a sealing region of a pair of superposed heatsealable layers interposed between said bars, switching means operable after displacement of said bars has been initiated to connect said heater element to a source of current to practically instantaneously heat said heater element to heatsealing temperatures, means for locking said bars against their return displacement after their operative position has been obtained, means for interrupting the flow of current through said heater element after sufficient heat has been transferred to the heatsealing region of the layers to cause heat welding thereof, means for continuously passing a cooling fluid through at least one of said bars to rapidly withdraw heat from said region, and means for disabling said locking means after said heater element and said sealed region have been cooled considerably below heatsealing temperatures.

12. A heatsealing machine comprising, in combination, a pair of pressure members having cooperating pressure surfaces mounted for reciprocation, a layer of insulation on the surface of one of said members, an electrically conducting heater element externally mounted on said layer of insulation, the heat capacity of said element being low as compared to that of said member and said layer of insulation being sufficiently thin to maintain said heater element in intimate heat exchange relation with but electrically disconnected from the said member, means for reciprocating said members to apply pressure upon a region of a pair of thermoplastic layers interposed between said members, means for passing current for a heating period shorter than the period of pressure application through said heater element to raise the temperature thereof and of the said region of the layers to heatsealing temperatures, and means for passing a cooling fluid in intimate heat exchange relation with at least one of the said pressure members and with the heater element thereon for rapidly cooling and consolidating the seam formed in said region immediately after said heating period.

13. In combination with a heatsealing machine of the electrical impulse type, a sealing bar comprising a metal base, a layer of electrically conducting material carried thereby through which sealing impulses of current may be passed, and a layer of insulation interposed between said metal base and said layer of conducting material, said layer of insulation being sufficiently thin to maintain the base and the conducting layer thereon in intimate heat exchange relation with but electrically insulated from each other.

14. A sealing member for heatsealing machine of the electrical impulse type comprising, in combination, a metal base of substantial heat capacity, a layer of electrically conducting material through which sealing impulses of current may be passed carried by said base and having a negligible heat capacity as compared to that of the base, and a layer of insulation interposed between said metal base and said layer of conducting material, said layer of insulation being sufficiently thin to maintain the base and the conducting layer thereon in intimate heat exchange relation with but electrically insulated from each other.

15. A sealing device for heatsealing machines of the electrical impulse type comprising, in combination, a metal base, a layer of electrically conducting material carried by said base through which sealing impulses of current may be passed, said conducting layer having sufficiently low heat capacity so as to respond to changes of current by changes of temperature with a negligible time lag and having a surface configuration corresponding to the configuration of the desired seal, and a layer of insulation interposed between said metal base and said conducting layer, said layer of insulation being sufficiently thin for maintaining said base and said conducting layer in intimate heat exchange relation while preventing electrical contact therebetween.

16. A sealing device for heatsealing machines of the electrical impulse type comprising, in combination, a metal base, a layer of electrically conducting material carried thereby through which sealing impulses of current may be passed, a layer of insulation interposed between said metal base and said conducting layer, said layer of insulation being sufficiently thin for maintaining said base and said conducting layer in intimate heat exchange relation while preventing their electrical contact, and a second thin layer of insulation on said conducting layer constituting the operating surface of the device.

17. In combination with a heatsealing machine of the electrical impulse type, a sealing bar comprising a metal base having a pressure face, a first layer of insulation on said face, a layer of electrically conducting material through which sealing impulses of current may be passed superposed on said layer, and a second layer of insulation superposed on said conducting layer the top surface of which constitutes the operating surface of the bar and is adapted to be brought into pressure contact with a layer of thermoplastic material to be heatsealed to another layer of such material, said layers of insulation being sufficiently thin to maintain the layers between which they are interposed in intimate heat exchange relation with but electrically disconnected from each other.

18. A sealing member for heatsealing machines of the electrical impulse type comprising a stratified body of a plurality of superimposed layers sequentially including a first metal layer, a first layer of insulation, a second metal layer, and a second layer of insulation the exposed surface of which constitutes the operating sealing face of the member, the heat capacity of the first metal layer being substantial as compared to that of the second metal layer and the heat capacity of the second metal layer being low enough to have its temperature follow the changes of sealing current impulses passed therethrough with a negligible time lag, and the thickness of said insulating layers being sufficiently low for providing intimate heat exchange therethrough and between the other layers between which they are interposed.

19. A machine for heatsealing thermoplastic layers comprising, in combination, a pair of cooperating pressure bars mounted for relative reciprocation; at least one of said bars including a metal base, a layer of insulating material thereon, and a layer of electrically conducting material superposed on said insulating layer, said interposed layer of insulating material being sufficiently thin to maintain said conducting layer in intimate heat exchange relation with said metal base; means for reciprocating said bars to first displace them into a closed position in which they apply pressure to a region of the layers to be heat sealed interposed between the operative faces of the bars; and means effective during reciprocation of said bars for passing current through said conducting layer for a predetermined period to heat said conducting layer and said region of the thermoplastic layers to heatsealing temperatures; said reciprocating means being then effective after termination of said period and upon removal of the residual heat from the sealed region and from the said conducting layer through said insulating layer into said metal base to terminate the pressure applied to said region.

20. A machine for heatsealing thermoplastic layers comprising, in combination, a pair of cooperating pressure bars mounted for relative reciprocation; one of said bars comprising a stratified body of a plurality of superimposed layers sequentially including a first metal layer, a first layer of insulation, a second metal layer, and a second layer of insulation the exposed surface of which constitutes the operating sealing face of the bar, the first metal layer having substantial heat capacity as compared to that of the second metal layer and said layers of insulation being sufficiently thin to maintain intimate heat exchange therethrough and between the other layer between which they are interposed; means for reciprocating said bars to first displace them into a closed position in which they apply pressure to a region of the layers to be heatsealed interposed between the operative faces of the bars; and means operable during reciprocation of said bars for passing current through said second metal layer for a predetermined period to heat said second metal layer and through said second layer of insulation said region of the thermoplastic layers to heatsealing temperatures; said reciprocating means being then effective after termination of said period and upon removal of the residual heat from the sealed region and from the said second metal layer through said first insulating layer into said first metal layer to terminate the pressure applied to said region.

NICHOLAS LANGER.

REFERENCES CITED

The following references are of record in the file of this patent:

UNITED STATES PATENTS

| Number | Name | Date |
|---|---|---|
| 2,248,248 | Nye et al. | July 8, 1941 |
| 2,289,618 | Young | July 14, 1942 |
| 2,309,280 | Stansbury | Jan. 26, 1943 |
| 2,330,055 | Holloway | Sept. 21, 1943 |
| 2,460,460 | Langer | Feb. 1, 1949 |

FOREIGN PATENTS

| Number | Country | Date |
|---|---|---|
| 437,665 | Germany | Nov. 25, 1926 |
| 119,013 | Australia | Sept. 26, 1944 |